United States Patent
Ivakitch

(10) Patent No.: US 7,850,173 B2
(45) Date of Patent: Dec. 14, 2010

(54) REPAIRABLE LABYRINTH SEAL

(75) Inventor: Richard Ivakitch, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 582 days.

(21) Appl. No.: 11/513,230

(22) Filed: Aug. 31, 2006

(65) Prior Publication Data

US 2008/0069697 A1    Mar. 20, 2008

(51) Int. Cl.
*F16J 15/447* (2006.01)
*B23P 6/00* (2006.01)

(52) U.S. Cl. .................... 277/421; 277/418; 29/402.02; 29/402.13; 29/402.07

(58) Field of Classification Search ......... 277/418–421; 29/402.02, 402.13, 402.07
See application file for complete search history.

(56) References Cited

U.S. PATENT DOCUMENTS

| | | | | |
|---|---|---|---|---|
| 2,874,005 A | * | 2/1959 | Engstrom | 305/192 |
| 3,771,798 A | * | 11/1973 | McDonald et al. | 277/412 |
| 3,846,899 A | * | 11/1974 | Gross | 29/402.02 |
| 4,148,494 A | * | 4/1979 | Zelahy et al. | 277/415 |
| 4,285,108 A | * | 8/1981 | Arrigoni | 29/889.1 |
| 4,397,471 A | * | 8/1983 | Feldman et al. | 277/412 |
| 4,606,102 A | * | 8/1986 | Riethmuller | 29/889.1 |
| 4,657,171 A | * | 4/1987 | Robins | 228/119 |
| 5,211,535 A | | 5/1993 | Martin et al. | |
| 5,984,314 A | * | 11/1999 | Peters et al. | 277/417 |
| 6,200,689 B1 | | 3/2001 | Ferrigno et al. | |
| 7,363,707 B2 | * | 4/2008 | Powers | 29/889.1 |

* cited by examiner

*Primary Examiner*—Alison K Pickard
(74) *Attorney, Agent, or Firm*—Ogilvy Renault

(57) ABSTRACT

A repairable labyrinth seal of a gas turbine engine comprises at least one fin having a base with a thickness and a tip portion extending therefrom. A shoulder distinguishes the base from the tip portion. The shoulder defines a machining site suitable for receiving a welded replacement piece for shaping a new tapered tip portion following removal of a worn tapered tip portion.

5 Claims, 3 Drawing Sheets

REPAIRABLE LABYRINTH SEAL

TECHNICAL FIELD

The invention relates generally to a gas turbine engine and, more particularly, to a repairable labyrinth seal.

BACKGROUND OF THE ART

Labyrinth seals of a gas turbine engine are often used as air-oil seals to provide sealing of rotating shafts of bearing compartments and gear cases, etc. Labyrinth seals typically comprise knife edges or teeth or fins which rotate relative to a surrounding seal land or runner, the knife edges having tight tip clearances with a surface of the land or runner. The relative rotation between the knife edges and the runner of labyrinth seals, however, can tend to cause knife edge wear which can significantly reduce the sealing capability.

Labyrinth seals are life limited parts that are not repairable and are therefore generally not attached to high cost parts such as impellers or rotors. Instead they are components in and of themselves. Separate labyrinth seals require additional part count per engine, and additional cost due to extra machining of mating parts.

Accordingly, there is a need to provide a repairable labyrinth seal that addresses at least some of the above issues.

SUMMARY OF THE INVENTION

It is therefore an object of this invention to provide a repairable labyrinth seal.

In one aspect, the present invention provides a repairable labyrinth seal comprising at least one fin, the fin having a base with a thickness and a tapered tip portion extending therefrom, at least one shoulder distinguishing the base from the tapered tip portion, the shoulder defining a machining site suitable for receiving a welded replacement piece for shaping a new tapered tip portion following removal of a worn tapered tip portion.

In a second aspect, the present invention provides a rotor assembly of a gas turbine engine comprising a rotary component having at least one integral labyrinth seal having at least one fin and a runner mounted for relative rotation, the runner having a runner surface facing the fin, the fin having a base with a thickness and a tapered tip portion extending therefrom, at least one shoulder distinguishing the base from the tapered tip portion, the shoulder defining a machining site suitable for receiving a replacement piece for shaping a new tapered tip portion following removal of a worn tapered tip portion.

In a third aspect, the present invention provides a method of repairing a labyrinth seal having at least one worn fin comprising removing a worn tip portion of the fin down to a surface sufficient for receiving a weld, and welding a replacement piece to said surface.

In a fourth aspect, the present invention provides a repairable labyrinth seal comprising at least one fin extending outwardly from a seal body, the fin having a base portion having a height relative to said seal body and a predetermined transversal thickness, a tip portion tapering from said base portion away from said seal body, a reference plane separating the base portion from the tip portion defining a machining site, the predetermined thickness of the base portion at the machining site allowing for machine removal of the tapered tip portion and replacement of a new tapered tip portion to the base at the machining site.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
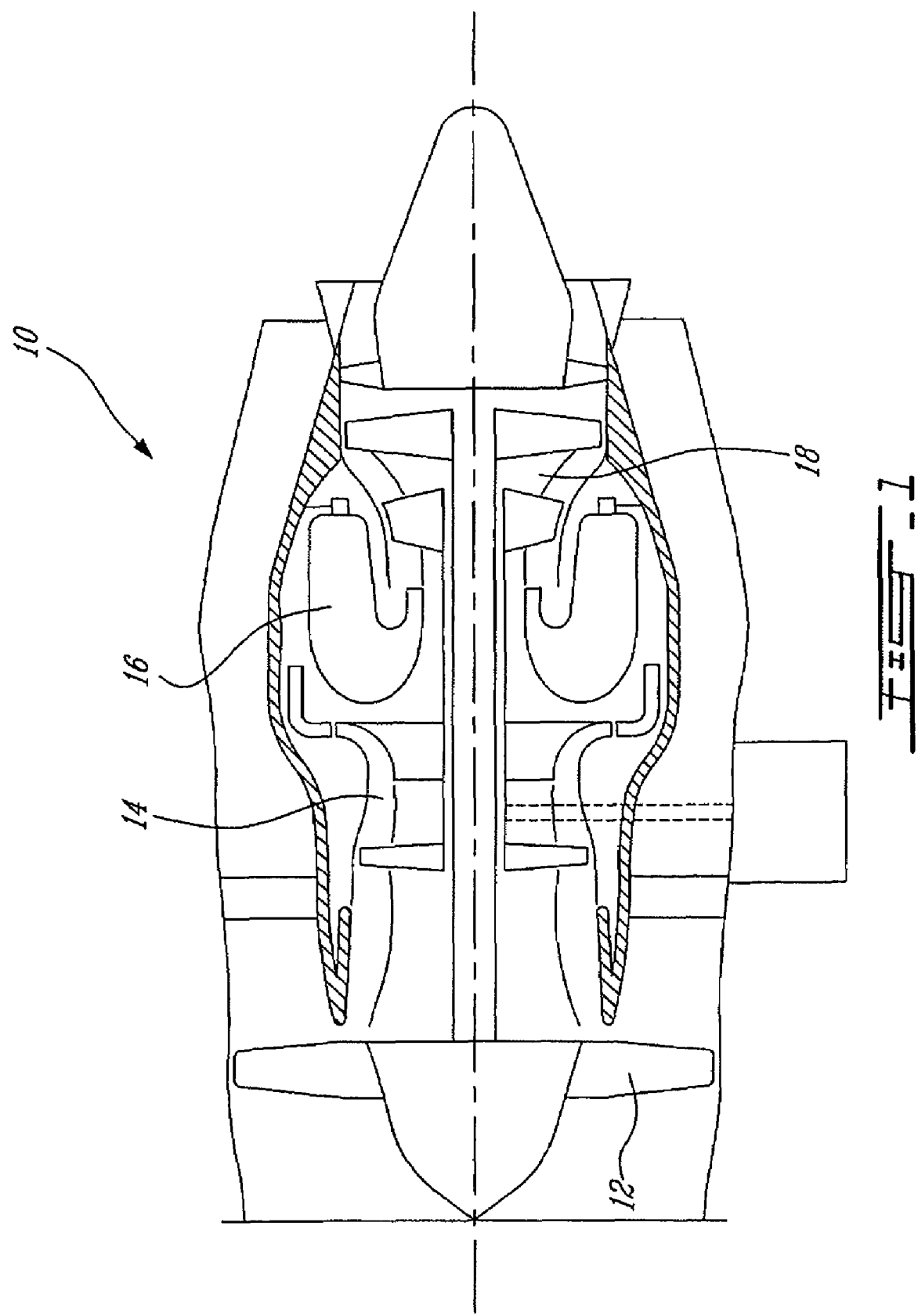
FIG. 1 is a cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
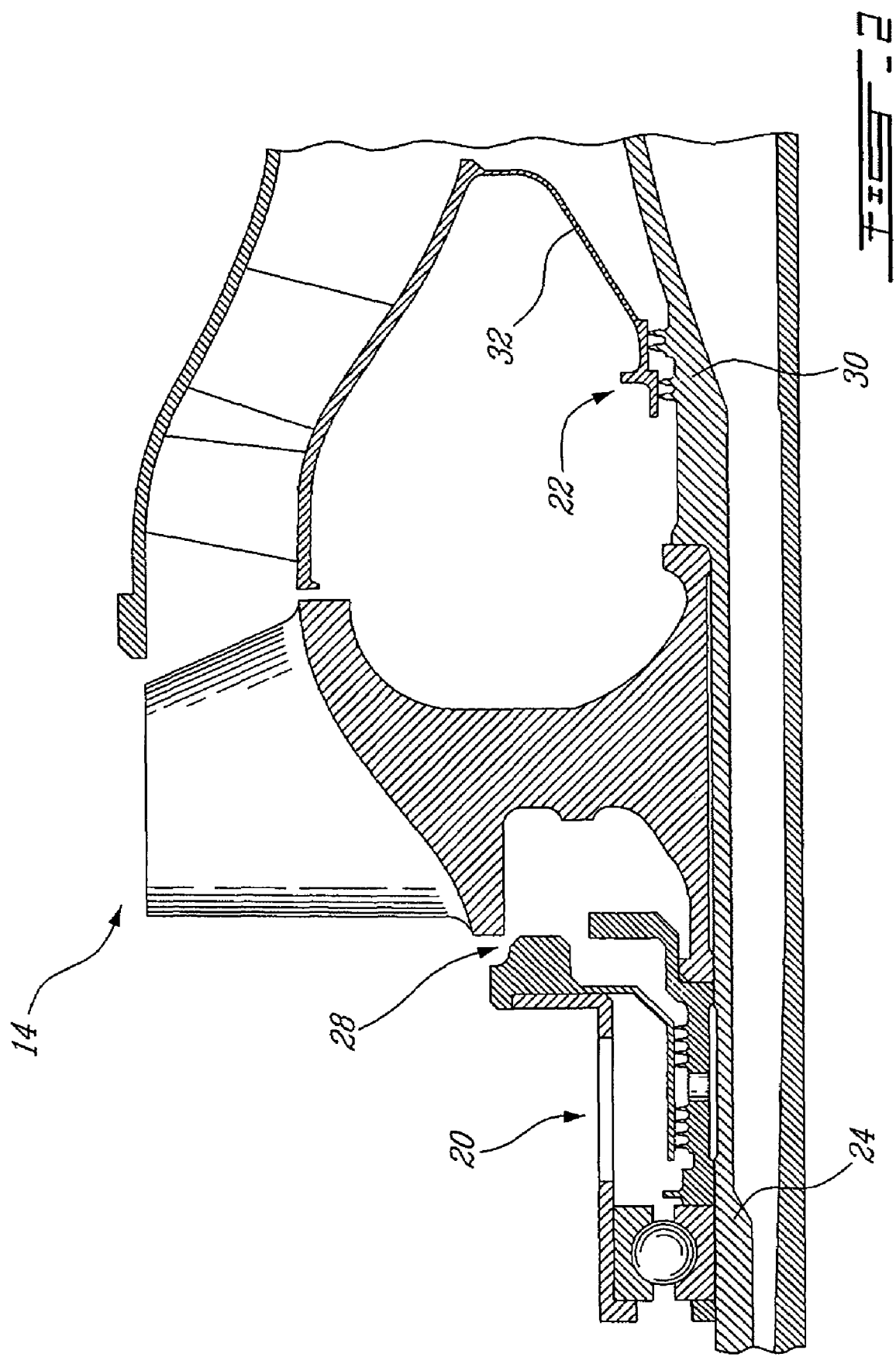
FIG. 2 is a cross-sectional view of a compressor section of the engine of FIG. 1, showing a repairable labyrinth seal in accordance with a particular embodiment of the present invention.

FIG. 2 illustrates a section of the compressor 14 including a conventional non repairable labyrinth seal 20 and a repairable labyrinth seal 22. Particularly, the non repairable labyrinth seal 20 is exemplified mounted concentrically about a rotating shaft 24 providing sealing between the rotating shaft 24 and a surrounding part 28. The repairable labyrinth seal 22 is shown integrally formed oil impeller 30 providing sealing between impeller 30 and a portion of the stationary outer casing 32 defining the gas path.

Figure 3:
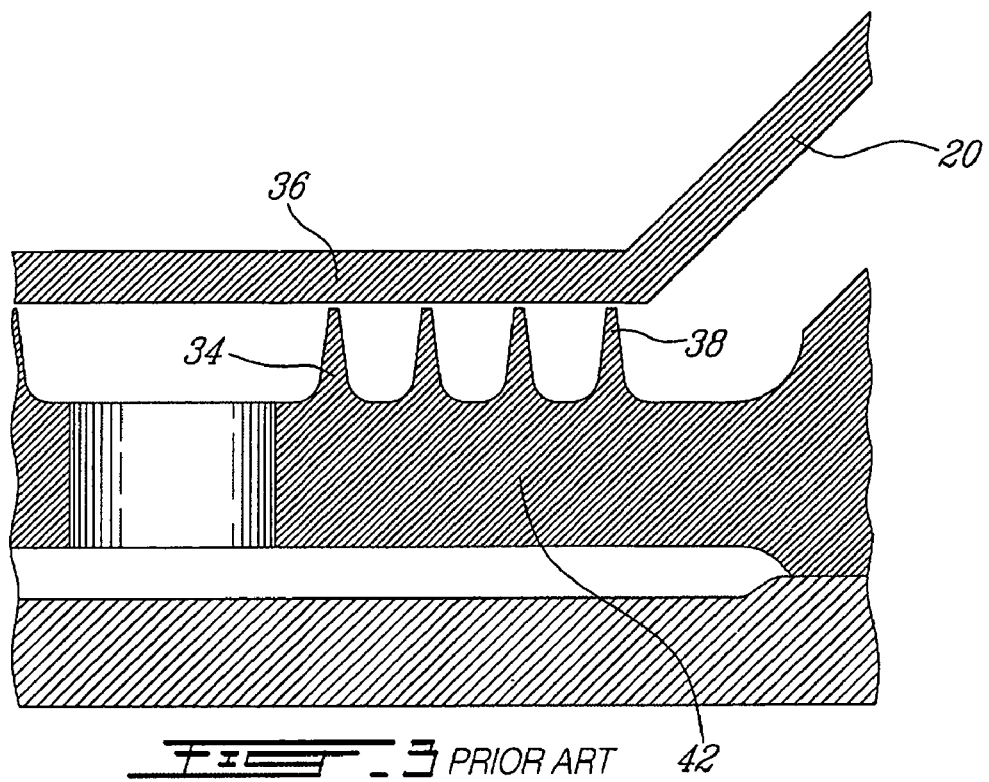
FIG. 3 is a cross-sectional view of a labyrinth seal in accordance with the prior art.

FIG. 3 depicts an enlarged view of the non-repairable labyrinth seal 20, whish has a configuration commonly known in the art. Particularly, labyrinth seal 20 can generally be described as comprising a plurality of fins 34 which rotate with the rotating shaft 24 relative to a juxtaposed runner 36. Tips 38 of the fins 34 are disposed adjacent to runner surface 40 of runner 36 in very tight clearance thereto such that a substructure fluid seal is provided therebetween. Fins 34 extend from a base element 42, tapering all the way to the tips 38.

Figure 4:
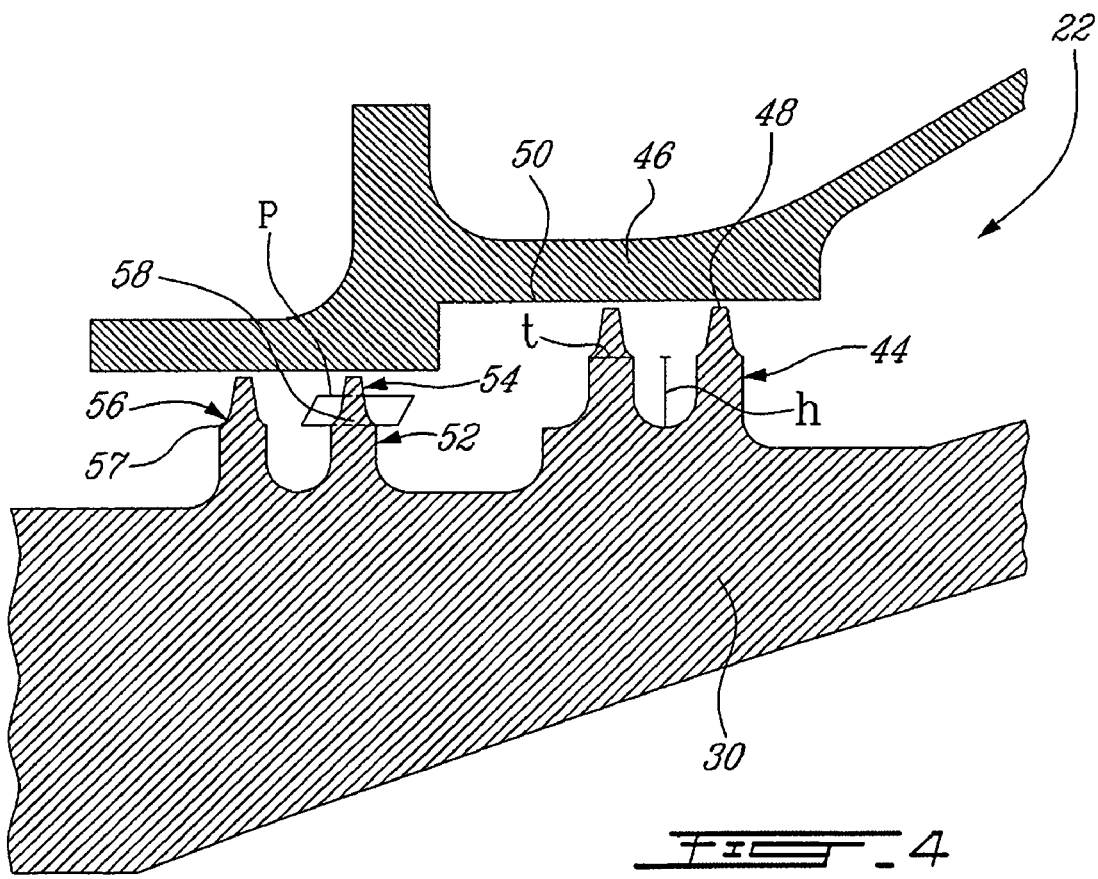
FIG. 4 is a cross-sectional view of the repairable labyrinth seal shown in FIG. 2.

FIG. 4 depicts an enlarged view of repairable labyrinth seal 22 in accordance with a particular embodiment of the present invention. Labyrinth seal 22 also comprises a plurality of fins 44 which rotate with the impeller 30 relative to juxtaposed runner 46. Tips 48 of the fins 44 are disposed adjacent to the runner surface 50 of the runner 46 in very tight clearance thereto such that a substructure fluid seal is provided therebetween. Fins 44 extend integrally from the impeller surface.

Still referring to FIG. 4, it can be seen that the fins 44 have a particular shape differing from that of fins 34 of generic labyrinth seal 20. Fins 44 comprise a base 52 and a tapered tip portion 54 extending therefrom. Particularly, the base 52 has a generally rectangular shape with a predetermined thickness t and a height h. According to one embodiment, t=0.040 inch and h=0.060 inch. The thickness t may range from about 0.030 inch to about 0.060 inch. The height h may range from about 0.030 inch to about 0.200 inch. Notably, the base 52 has a height h that is generally greater than half the overall fin height.

A shoulder 56 is defined on each side of the base 52 at height h distinguishing between the two sections of the fin 44. Shoulders 56 each define an edge 57 leading into the tapered tip portion 54. An imaginary reference plane P located at height h separating the base 52 from the tapering tip portion 54 defines a machining site 58 on the base 52. The reference plane P is generally parallel to an axis of rotation of the gas turbine engine 10. The machining site 58 is identified by shoulders 56 and is suitable for receiving a welded replacement piece shaped into a new tapered tip portion following removal of a worn tapered tip portion. Notably, the height of the new tapered tip portion is determined from the reference plane P.

The predetermined thickness t of the base 52 at the machining site 58 allows for removal of a worn tapering tip portion, preferably by machining off the entire worn tapered tip portion down to the base 52. The predetermined thickness t at the machining site 58 also allows for replacement of a new piece of material for shaping a new tapering tip portion welded to the base 52 at the machining site 58. Thus, the fins 44 have a particular shape propitiously suited for subsequent reparation by way of machining. The minimum surface area of each fin machining site, i.e. the cross-section area of base 52, is at least equal to about 0.25 inch$^2$ to permit welding.

A method of repairing a labyrinth seal in accordance with a particular embodiment of the present invention is described below. The first step entails a skilled person to identify shoulder 56, and more specifically the reference plane P as the machining site 58. The next step is to machine off the worn tapered tip portion down to the machining site 58, and then to subsequently weld on a replacement piece of material for shaping a new tapered tip portion. Preferably, the replacement piece of material is provided as a ring and a butt weld is used to attach the replacement piece at the machining site 58. Then, the welded replacement piece is heat treated and inspected for quality control. Finally, the replacement piece of material is machined into the final shape of a new tapered tip portion.

Thus, the repairable labyrinth seals of the present invention exemplified in the above description and in the accompanying Figures provided many advantages over generic labyrinth seals. One advantage is that repairable labyrinth seals can be made integral with high cost and complex components such as impellers and rotors, as described above, which advantageously reduces overall engine part count. Another advantage of using an integral labyrinth seal design is that the functionality of the seal is improved due to the fact that the eccentricity of the repairable labyrinth seal diameter can be machined relative to the rotor datums. Thus, a repairable labyrinth seal design enables part integration thereby improving sealing performance.

The above description is meant to be exemplary only, and one skilled in the art will recognize that changes may be made to the embodiments described without department from the scope of the invention disclosed. For example, in this particular embodiment the fins 44 of repairable labyrinth seal 22 are disposed on a component which rotates within a stationary surrounding runner, but it is to be understood that the converse is also possible, namely that the runner surface rotates and the fins of the labyrinth seal disposed in close juxtaposition thereto remain stationary. Further, both portions of the labyrinth seal, ie. the fins and the runner, may be rotating.

Still other modifications which fall within the scope of the present invention will be apparent to those skilled in the art, in light of a review of this disclosure, and such modifications are intended to fall within the appended claims.

What is claimed is:

1. A method of providing a repairable labyrinth seal on a rotary component requiring sealing, comprising: integrally forming a fin in a surface of the rotary component, the fin being formed with a base integrally extending from the surface of the rotary component and a tip extending from the base, a shoulder distinguishing the base from the tip, using the shoulder as a reference on the fin to determine the amount of material to be removed from the fin to allow for a weld repair of a worn or damaged portion of the tip, removing material from the tip down to the shoulder, the shoulder offering a surface area sufficient for receiving a weld, and welding a replacement piece on said shoulder.

2. The method of claim 1 wherein the removing step comprises machining off the worn tip portion down to the shoulder.

3. The method as defined in claim 1, further comprising the step of heat treating the welded piece.

4. The method as defined in claim 3, further comprising the step of inspecting the welded piece.

5. The method as defined in claim 4, further comprising the step of shaping the welded piece into a replacement tapered tip portion.

* * * * *